United States Patent
Cao et al.

(10) Patent No.: US 11,487,161 B2
(45) Date of Patent: Nov. 1, 2022

(54) DISPLAY PANEL,METHOD OF PHOTO ALIGNMENT AND DRIVING METHOD OF THE DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventors: Junhong Cao, Chongqing (CN); Wei Li, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/368,843

(22) Filed: Jul. 7, 2021

(65) Prior Publication Data
US 2022/0035206 A1    Feb. 3, 2022

(30) Foreign Application Priority Data
Jul. 29, 2020    (CN) .......................... 202010743758.X

(51) Int. Cl.
*G02F 1/1337*    (2006.01)
*G02F 1/1339*    (2006.01)
*G02F 1/1343*    (2006.01)
*G09G 3/36*    (2006.01)

(52) U.S. Cl.
CPC .... *G02F 1/133761* (2021.01); *G02F 1/13394* (2013.01); *G02F 1/133707* (2013.01); *G02F 1/133753* (2013.01); *G02F 1/134309* (2013.01); *G02F 1/134318* (2021.01); *G09G 3/3688* (2013.01)

(58) Field of Classification Search
CPC ......... G02F 1/133761; G02F 1/133753; G02F 1/133707; G02F 1/13394; G02F 1/134318
See application file for complete search history.

(56) References Cited

U.S. PATENT DOCUMENTS

2012/0154716 A1* 6/2012 Kaise ................ G02F 1/134336
349/85
2012/0223931 A1* 9/2012 Tashiro ............. G02F 1/134309
345/92

\* cited by examiner

*Primary Examiner* — Jessica M Merlin

(57) ABSTRACT

The present application discloses a display panel, a method of photo alignment and a driving method of the display panel. A display area of the display panel is divided into at least a first area and a second area, light transmittance of the first area is different from that of the second area when driven by the identical voltage difference, and pre-tilt angles of liquid crystal molecules corresponding to the first area are different from those of liquid crystal molecules corresponding to the second area.

12 Claims, 6 Drawing Sheets

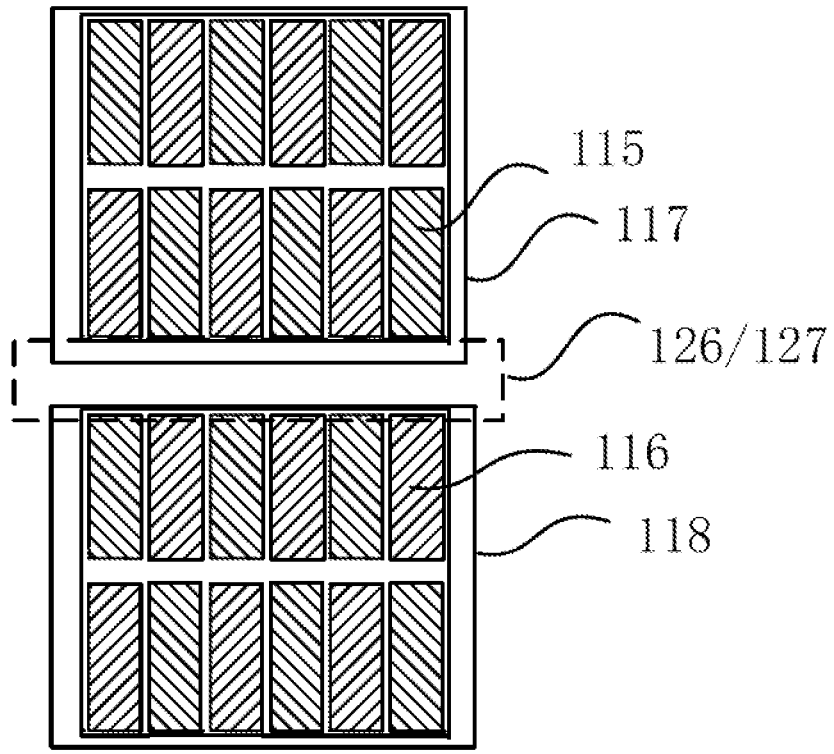

FIG. 8

Applying a first common voltage to the first common electrode, and applying a second common voltage different from the first common voltage to the second common electrode to allow the first common electrode and the second common electrode to form different voltage differences with the corresponding pixel electrodes — S91

Performing photo-alignment after liquid crystal molecules in a liquid crystal layer reach predetermined deflection angles to allow the liquid crystal molecules in the liquid crystal layer to form different pre-tilt angles corresponding to the first common electrode and the second common electrode — S92

FIG. 9

DISPLAY PANEL, METHOD OF PHOTO ALIGNMENT AND DRIVING METHOD OF THE DISPLAY PANEL

The present application claims priority to Chinese Patent Application No. 202010743758.X, filed Jul. 29, 2020, which is hereby incorporated by reference herein as if set forth in its entirety.

TECHNICAL FIELD

The present application relates to the technical field of display, particularly to a display panel, a method of photo alignment and a driving method of the display panel.

BACKGROUND

The statements herein merely provide background information related to the present application and do not necessarily constitute the conventional art.

A display panel, such as a liquid crystal display panel, includes a first substrate (such as an array substrate), a second substrate (such as a CF substrate) and a liquid crystal layer disposed between the first substrate and the second substrate. The liquid crystal layer is generally aligned by Fine Slit Vertical Alignment (FSA) technology which is also known as Polymer Stabilized Vertically Aligned (PSVA) or Polymer Sustained Alignment (PSA) display technology.

Taking the FSA technology as an example, there is a color shift for a large display panel.

SUMMARY

The present application provides a display panel, a method of photo alignment and a driving method of the display panel to improve color shifts.

The present application discloses a display panel, including a first substrate, a second substrate and a liquid crystal layer, where the first substrate is disposed opposite to the second substrate, and the liquid crystal layer is disposed between the first substrate and the second substrate. A display area of the display panel is divided into at least a first area and a second area, the light transmittance of the first area is different from that of the second area when driven by the identical voltage difference, and pretilt angles of liquid crystal molecules corresponding to the first area are different from those of liquid crystal molecules corresponding to the second area.

The present application further discloses a photo-alignment method for a display panel, where a display area of the display panel is divided into at least a first area and a second area, the display panel includes a first substrate and a second substrate; the first substrate includes a plurality of pixel electrodes; and the second substrate includes a first common electrode and a second common electrode with a spacer disposed between the first common electrode and the second common electrode for insulation from each other;

the photo-alignment method includes steps of:

applying a first common voltage to the first common electrode, and applying a second common voltage different from the first common voltage to the second common electrode to allow the first common electrode and the second common electrode to form different voltage differences with the corresponding pixel electrodes; and performing photo-alignment after liquid crystal molecules in a liquid crystal layer reach predetermined deflection angles to allow the liquid crystal molecules in the liquid crystal layer to form different pre-tilt angles corresponding to the first common electrode and the second common electrode.

The present application further discloses a driving method for a display panel driving the display panel, including steps of:

providing a gate drive signal to control gate lines of the display panel to be sequentially connected, and providing a data driving signal to data lines of the display panel; and applying common voltages to the first common electrode and the second common electrode of the display panel;

where the common voltages of the first common electrode and the second common electrode are the identical.

With respect to a solution in which the pre-tilt angles of the liquid crystal molecules in the liquid crystal layer are the identical in an initial state, the pre-tilt angles of the liquid crystal molecules in the liquid crystal layer corresponding to the first area are different from those of the liquid crystal molecules in the liquid crystal layer corresponding to the second area in the present application, so that even if the identical voltage difference is applied to the liquid crystal molecules in the liquid crystal layer corresponding to the corresponding first area and the liquid crystal molecules in the liquid crystal layer corresponding to the second area, the light transmittance of the corresponding first area is different from that of the second area, and the first area is not overlapped with the second area, thus forming the first area with different brightness. The liquid crystal molecules in the first area and the second area can reach the expected tilt position more quickly when displaying driving, thus improving the color shift and improving the quality of the display panel in a wide viewing angle.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings:

FIG. 8 is a schematic diagram of pixel electrodes corresponding to a first common electrode and a second common electrode according to another embodiment of the present application;

FIG. 9 is a flowchart of a photo-alignment method for a display panel according to the present application.

DETAILED DESCRIPTION OF EMBODIMENTS

It should be understood that the terminology, specific structural and functional details disclosed are merely exemplary for the purpose of describing specific embodiments. However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "transverse", "up", "down", "left", "right", "vertical", "horizontal", "top", "bottom", "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation, be configured and operated in a particular orientation, and therefore cannot be construed as limiting the present application.

In addition, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, or an internal connection between two elements. For those skilled in the art, the specific meaning of the above terms in this application can be understood according to the specific circumstances.

Figure 1:
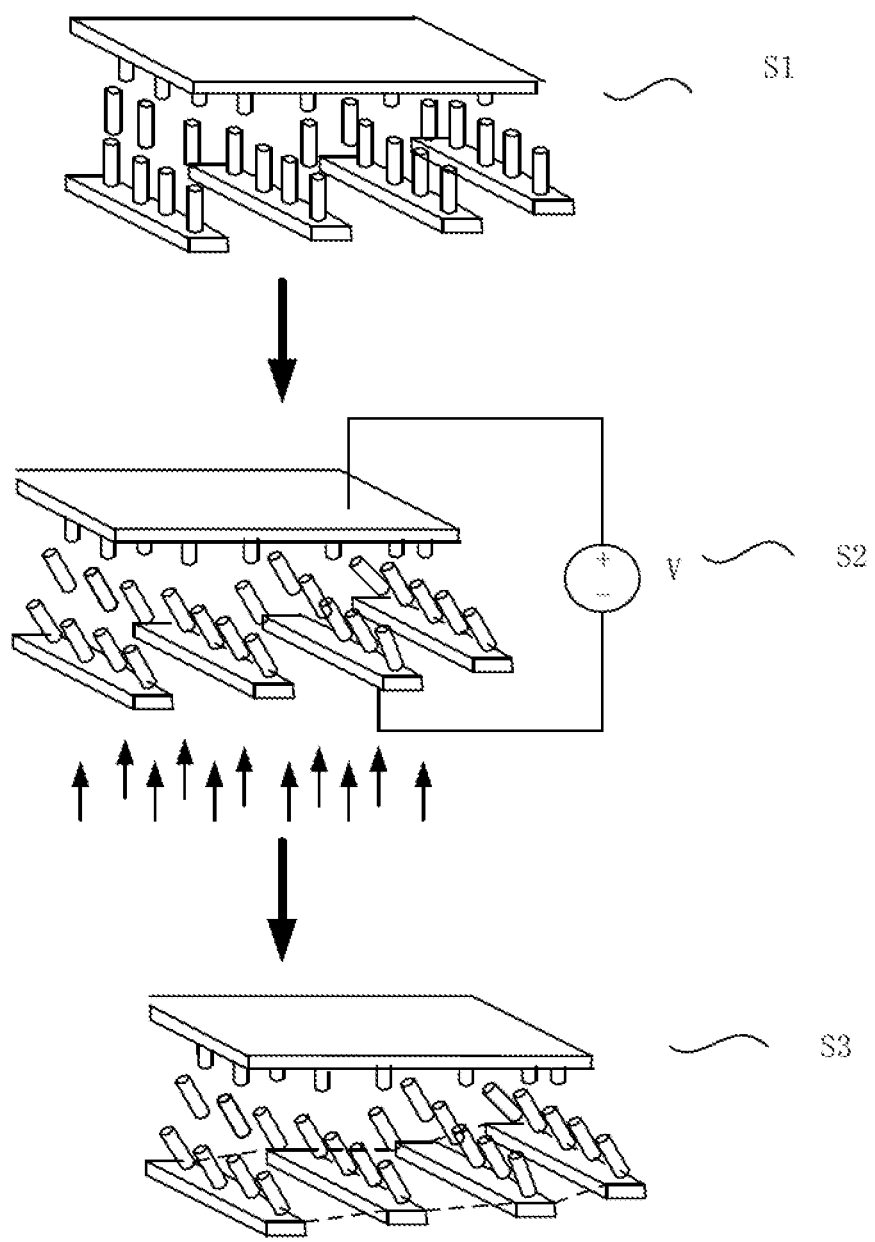
FIG. 1 is a flow schematic diagram of an exemplary FSA process.

FIG. 1 is a schematic diagram of an exemplary FSA process. As shown in FIG. 1, a photo-alignment method for a display panel includes steps of:

S1: applying a voltage in a specific step sequence to a first substrate and a second substrate to deflect liquid crystal molecules of a liquid crystal layer;

S2: applying ultraviolet irradiation after the voltage is stable to allow Monomer and Polyimide (PI) in the liquid crystal layer to react to form a polymer; and S3: fixing deflection angles of the liquid crystal molecules to form pre-tilt angles of in-cell liquid crystals.

The pre-tilt angles of the liquid crystal molecules in the corresponding liquid crystal layer in the photo-alignment process are the identical, and there is a color shift for a large display panel.

The present application will now be described in details by reference to the accompanying drawings and optional embodiments.

Figure 2:
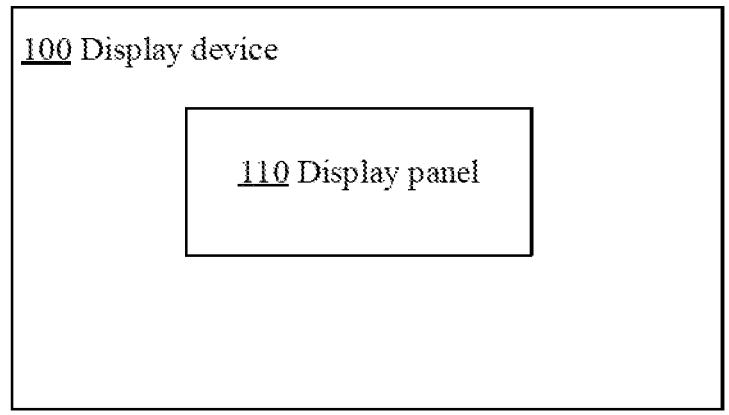
FIG. 2 is a block schematic diagram of a display device according to an embodiment of the present application.
Figure 3:
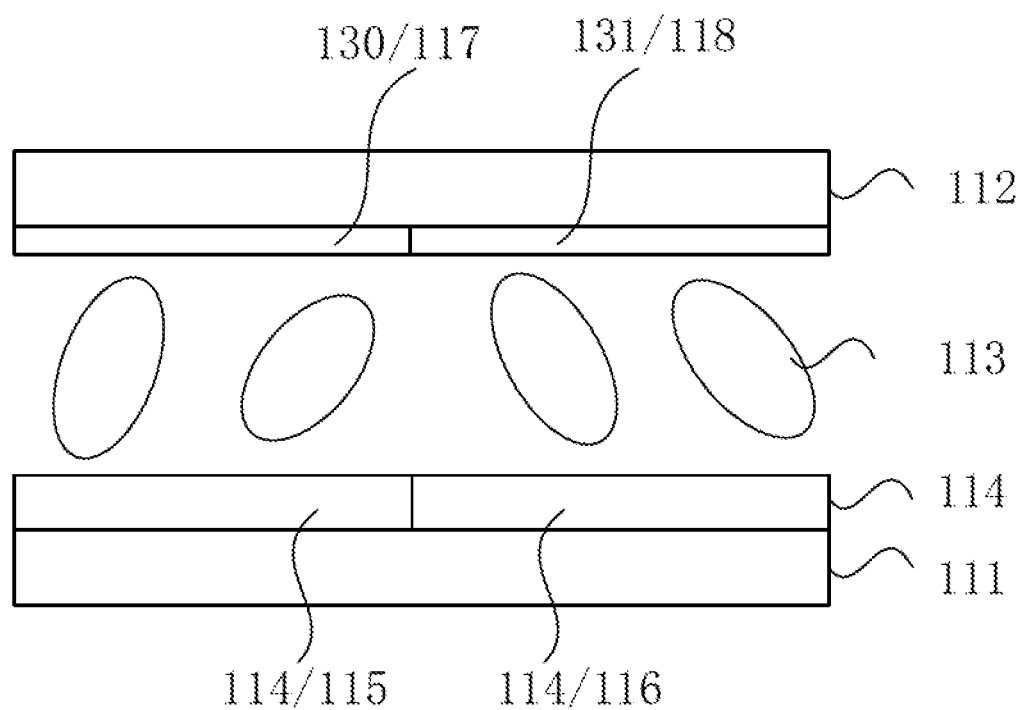
FIG. 3 is a schematic diagram of a display panel according to an embodiment of the present application.
Figure 4:
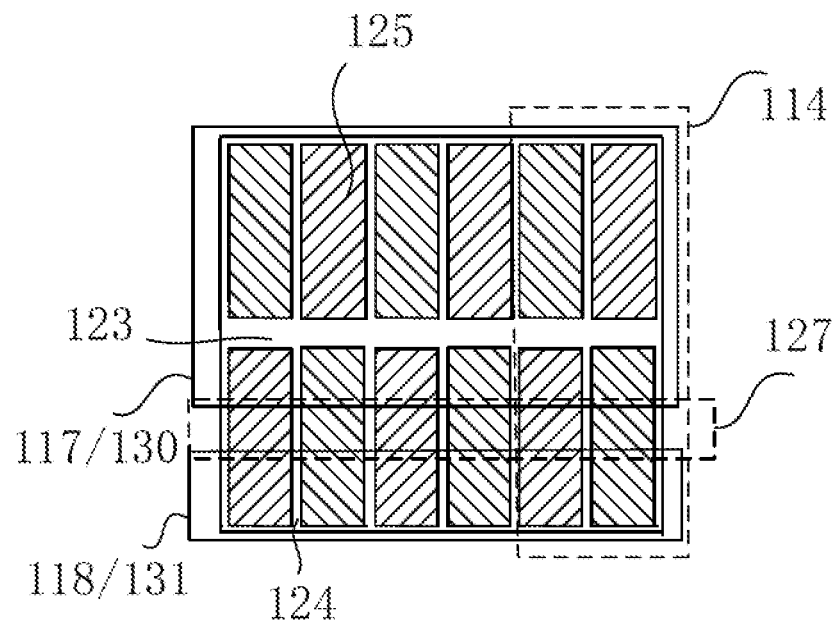
FIG. 4 is a schematic diagram of pixel electrodes corresponding to a first common electrode and a second common electrode according to an embodiment of the present application.

FIG. 2 is a block schematic diagram of a display device according to an embodiment of the present application; FIG. 3 is a schematic diagram of a display panel according to an embodiment of the present application; FIG. 4 is a schematic diagram of pixel electrodes corresponding to a first common electrode and a second common electrode according to an embodiment of the present application. As shown in FIG. 2, FIG. 3 and FIG. 4, the present application discloses a display device 100. The display device 100 includes the display panel 110, the display panel 110 includes a first substrate 111, a second substrate 112 and a liquid crystal layer 113, where the first substrate 111 is disposed opposite to the second substrate 112, and the liquid crystal layer 113 is disposed between the first substrate 111 and the second substrate 112. A display area 132 of the display panel 110 is divided into at least a first area 130 and a second area 131, the light transmittance of the first area 130 is different from that of the second area 131 when driven by the identical voltage difference, and the pre-tilt angles of the liquid crystal molecules corresponding to the first area 130 are different from those of liquid crystal molecules corresponding to the second area 131. Where the pre-tilt angles are angles between long axes of the liquid crystal molecules in the liquid crystal layer 113 and the first substrate 111.

With respect to a solution in which the pre-tilt angles of the liquid crystal molecules in the liquid crystal layer 113 are the identical in an initial state, the pre-tilt angles of the liquid crystal molecules in the liquid crystal layer 113 corresponding to the first area 130 are different from those of the liquid crystal molecules in the liquid crystal layer 113 corresponding to the second area 131 in the present application, so that even if the identical voltage difference is applied to the corresponding first area 130 and the second area 131, the light transmittance of the corresponding first area 130 is different from that of the second area 131, and the first area 130 is not overlapped with the second area 131, thus forming the first area 130 with different brightness. The liquid crystal molecules in the first area 130 and the second area 131 can reach the expected tilt position more quickly when displaying driving, thus improving the color shift and improving the quality of the display panel in a wide viewing angle. Where the first area 130 is a bright area when the light transmittance is relatively high, and the second area 131 is a dark area when the light transmittance is relatively low, or the first area 130 is a dark area when the light transmittance is relatively low, and the second area 131 is a bright area when the light transmittance is relatively high.

Specifically, the display panel includes a plurality of pixel electrodes 114, a first common electrode 117 and a second common electrode 118, where the first common electrode 117 and the second common electrode 118 are disposed on the second substrate 112 with a spacer 127 disposed between the first common electrode 117 and the second common electrode 118 for insulation from each other. The first common electrode 117 is overlapped with the corresponding pixel electrodes 114 to form a first area 130, and the second common electrode 118 is overlapped with the corresponding pixel electrodes 114 to form a second area 131. The pre-tilt angle of the liquid crystal molecules in the liquid crystal layer 113 corresponding to the first area 130 is different from the pre-tilt angle of the liquid crystal molecules in the liquid crystal layer 113 corresponding to the second area 131, and the pre-tilt angle is formed by controlling the first common electrode 117 and the second common electrode 118 to be connected to different common voltages in an alignment stage.

The liquid crystal molecules in the liquid crystal layer 113 corresponding to the first area 130 and the second area 131 can be controlled at different deflection angles by keeping the common voltage connected to the first common electrode 117 different from the common voltage connected to the second common electrode 118 to adapt to different display needs of the display panel. In addition, only one more mask is provided, so that the process design is relatively simple and easy to realize. Where the common voltage connected to the first common electrode 117 and the common voltage connected to the second common electrode 118 range from 15 V to 20 V. The common voltage connected to the first common electrode 117 is a first common voltage 128, and the common voltage connected to the second common electrode 118 is a second common voltage 129.

Figure 5:
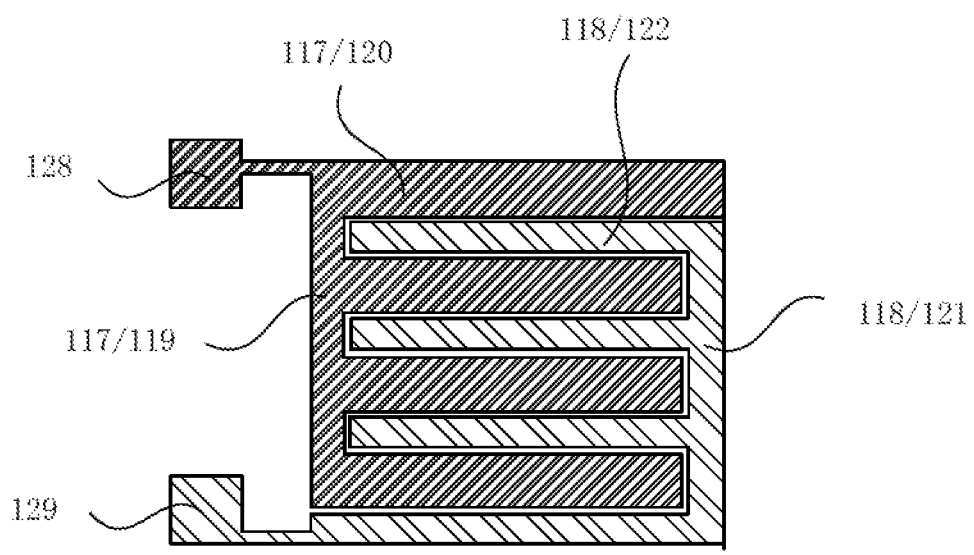
FIG. 5 is a schematic diagram of a top view of a first common electrode and a second common electrode according to an embodiment of the present application.
Figure 6:
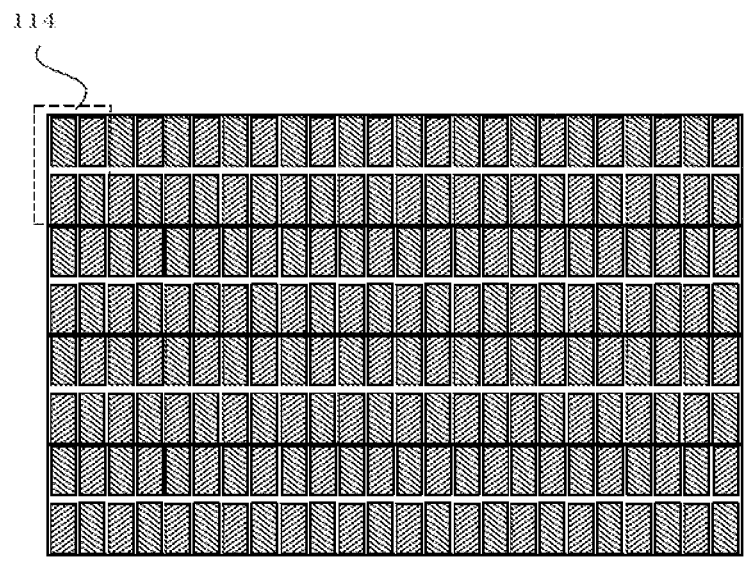
FIG. 6 is a schematic diagram of a top view of pixel electrodes according to an embodiment of the present application.
Figure 7:
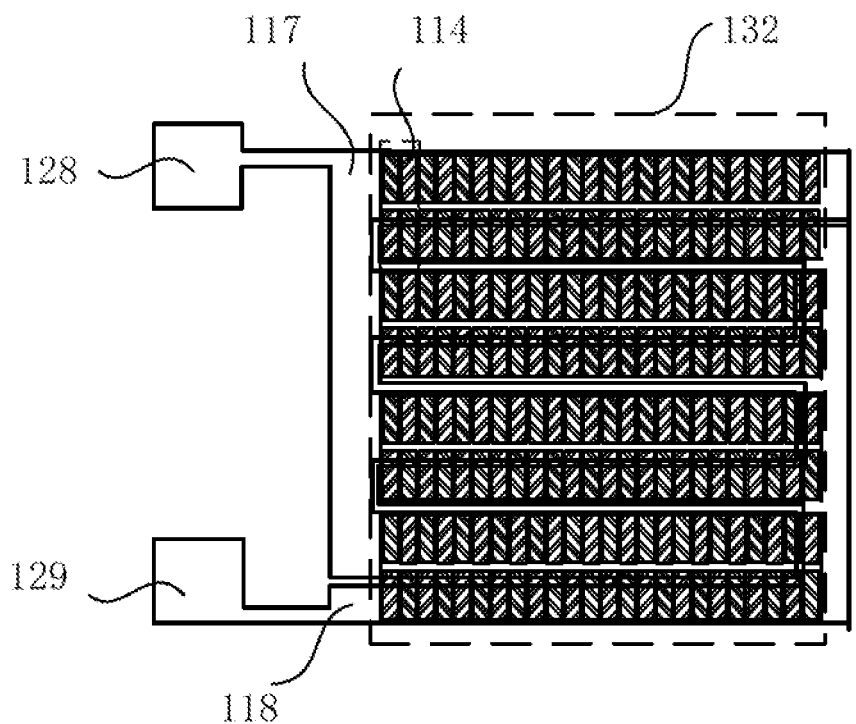
FIG. 7 is a superposed schematic diagram of FIG. 5 and FIG. 6 according to the present application.

FIG. 5 is a schematic diagram of a top view of a first common electrode and a second common electrode according to an embodiment of the present application, FIG. 6 is a schematic diagram of a top view of pixel electrodes according to an embodiment of the present application, and FIG. 7 is a superposed schematic diagram of FIG. 5 and FIG. 6 according to the present application. As shown in FIGS. 5 to 7, structures of the first common electrode 117 and the second common electrode 118 are as follows: the first common electrode 117 includes a first vertical portion 119 and a plurality of first horizontal portions 120, the first vertical portion 119 is in communication with the first horizontal portions 120 which extend in a direction perpendicular to the first vertical portion 119, and the plurality of first horizontal portions 120 are disposed in parallel along a scanning line direction of the display panel 110 with two adjacent first horizontal portions 120 spaced from each other. The second common electrode 118 includes a second vertical portion 121 and a plurality of second horizontal portions 122, the second vertical portion 121 is in communication with the second horizontal portions 122 which extend in a direction perpendicular to the second vertical portion 121, and the second horizontal portions 122 are disposed in parallel with two adjacent second horizontal portions 122 spaced from each other and a spacer 127 disposed between adjacent first horizontal portions 120 and second horizontal portions 122.

Common voltages connected to different common electrodes can be controlled by staggered arrangement of the first horizontal portions 120 of the first common electrode 117 and the second horizontal portions 122 of the second common electrode 118, so that the deflection angles of the liquid crystal molecules in the liquid crystal layer 113 corresponding to the first horizontal portions 120 of the first common electrode 117 and the second horizontal portions 122 of the second common electrode 118 are different, resulting in the formation of a bright area and a dark area with different brightness, thereby improving the color shift.

In order to improve the light transmittance of the display panel, due to the spacer 127 disposed between the first common electrode 117 and the second common electrode 118 for insulation, the display panel includes a common line 126, and a projection of the common line 126 is disposed corresponding to the spacer 127 between the first common electrode 117 and the second common electrode 118. The common line 126 of the display panel is disposed corresponding to the spacer 127 between the first common electrode 117 and the second common electrode 118, and the effective area for light transmission is larger, thereby increasing the light transmittance.

The common voltage connected to the first common voltage 128 is different from that connected to the second common voltage 129, so that the pre-tilt angles of the liquid crystal molecules in the liquid crystal layer 113 corresponding to the first common electrode 117 are different from those of the liquid crystal molecules in the liquid crystal layer 113 corresponding to the second common electrode 118. When the pixel electrodes 114 are connected to the identical data driving signal and the data voltage applied to the pixel electrodes 114 is 0 V, the areas corresponding to the first common electrode 117 and the second common electrode 118 form a bright area and a dark area, the area corresponding to the second common electrode 118 is the dark area when the area corresponding to the first common electrode 117 is the bright area, and the area corresponding to the bright area and the dark area may be the identical or different. More specifically, the light transmittance of the first area 130 is lower than that of the second area 131, and the ratio of the area of the first area 130 to that of the second area 131 is 1.5 to 2.3.

Since the light transmittance of the first area 130 is lower than that of the second area 131, the display brightness of the first area 130 corresponding to the first common electrode 117 is darker than the second area 131 corresponding to the second common electrode 118. Since the darker area has little impact on the overall display of the display panel, the color shift can be improved more effectively with less impact on the transmittance by setting the area of the dark area to be larger than that of the bright area.

When the first area 130 is a bright area and the second area 131 is a dark area, the pixel electrodes 114 include a first trunk 123, a second trunk 124 and a plurality of branches 125, the first trunk 123 and the second trunk 124 divide the pixel electrodes 114 into a plurality of alignment areas, the branches 125 are positioned in the alignment areas, and the first trunk 123 or the second trunk 124 corresponds to the first area 130, that is, more specifically, the area of the first area 130 is larger than that of the second area 131. Since the darker area has little impact on the overall display of the display panel, the color shift can be improved more effectively with less impact on the transmittance by setting the area of the dark area to be larger than that of the bright area.

As shown in FIG. 4, the first common electrode 117 and the second common electrode 118 may correspond to the identical pixel electrode 114, and the spacer 127 is staggered with the pixel electrode 114 and corresponds to a spacing between two adjacent pixel electrodes. Specifically, the identical pixel electrode 114 is overlapped with both the first common electrode 117 and the second common electrode 118 to form the first area 130 and the second area 131 respectively, that is, the spacer 127 between the first common electrode 117 and the second common electrode 118 is overlapped with the pixel electrode 114. The corresponding pixels can be displayed more uniformly by keeping common voltages of the first common electrode 117 and the second common electrode 118 corresponding to the identical pixel electrode 114 different.

When the first common electrode 117 and the second common electrode 118 correspond to the identical pixel electrode 114, the first trunk 123 or the second trunk 124 of the pixel electrode 114 is disposed corresponding to the spacer 127 between the first common electrode 117 and the second common electrode 118, which helps increase the light transmission area, thereby improving the light transmittance of the display panel and improving the display quality of the display panel.

As shown in FIG. 8, it is possible that the first common electrode 117 and the second common electrode 118 do not correspond to the identical pixel electrode, and in this case, the spacer 127 is staggered with the pixel electrode and corresponds to the spacing between two adjacent pixel electrodes. Specifically, two pixel electrodes in adjacent rows or columns are overlapped with the first common electrode 117 and the second common electrode 118 to form a first area 130 and a second area 131, respectively. That is, the spacer 127 between the first common electrode 117 and the second common electrode 118 corresponds to the spacing between two adjacent pixel electrodes 114. The first common electrode 117 and the second common electrode 118 correspond respectively to a first pixel electrode 115 and a second pixel electrode 116, and occupy a small area corresponding to the pixel electrodes, which helps improve the light transmittance.

Figure 10:
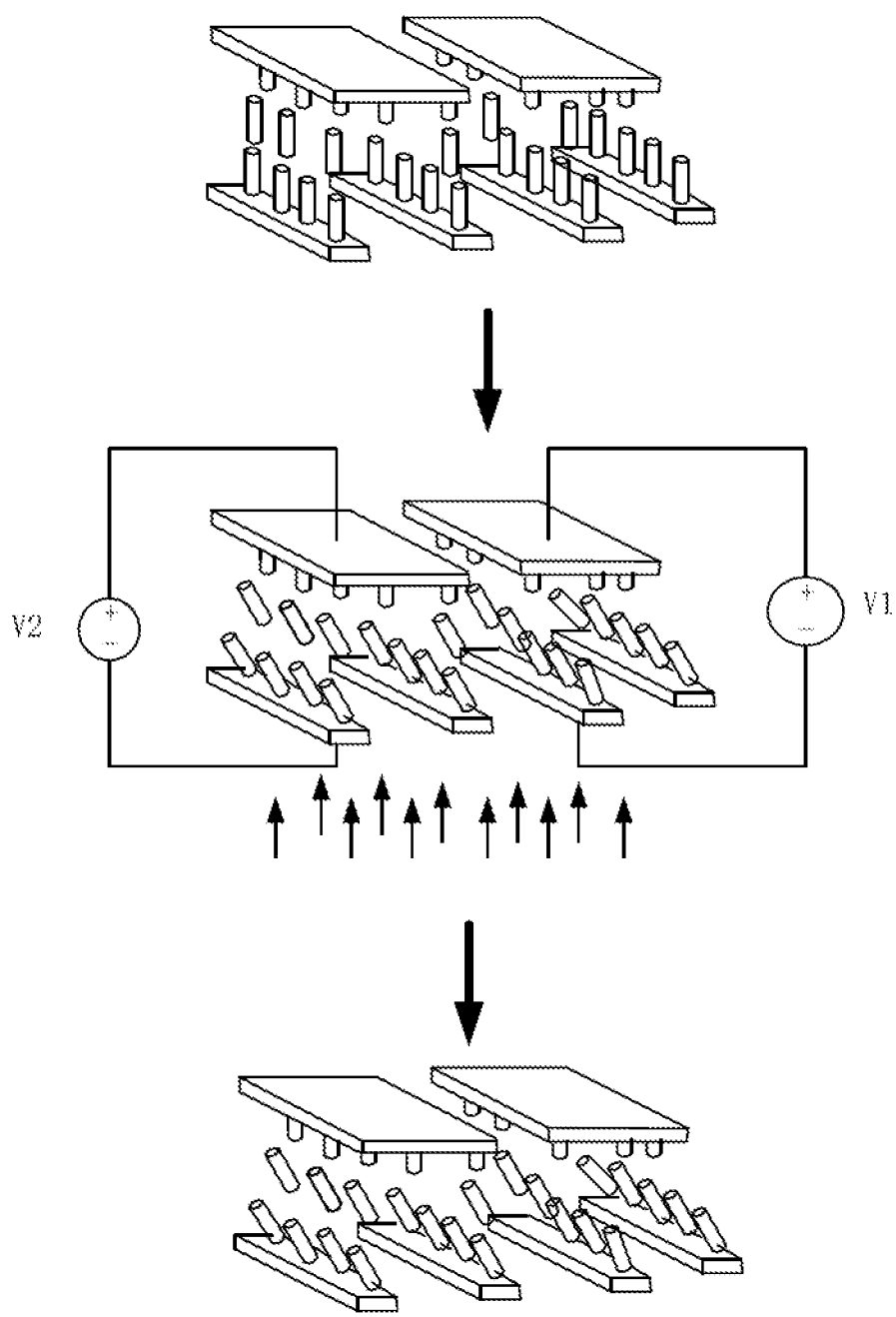
FIG. 10 is a flow schematic diagram of a photo-alignment process of a display panel according to the present application.

FIG. 9 is a flowchart of a photo-alignment method for a display panel according to the present application, and FIG. 10 is a flow schematic diagram of a photo-alignment process of a display panel according to the present application. As shown in FIG. 9 and FIG. 10, as another embodiment of the present application, a photo-alignment method for a display panel is disclosed. The display panel includes two glass substrates between which negative liquid crystal molecules mixed with a reactive monomer are filled. The surfaces of the glass substrates are coated with polyimide (PI) as an alignment base material. A display area 132 of the display panel is divided into at least a first area and a second area, the display panel includes a first substrate and a second substrate; the first substrate includes a plurality of pixel electrodes; and the second substrate includes a first common electrode and a second common electrode with a spacer disposed between the first common electrode and the second common electrode for insulation from each other.

The photo-alignment method includes steps of:

S91: applying a first common voltage to the first common electrode, and applying a second common voltage different from the first common voltage to the second common electrode to allow the first common electrode and the second common electrode to form different voltage differences with the corresponding pixel electrodes; and S92: applying ultraviolet irradiation for photo-alignment after liquid crystal molecules in a liquid crystal layer reach predetermined deflection angles and the voltage difference is stable to allow the monomer and PI in the liquid crystal molecules to react to form a polymer; and fixing deflection angles of the liquid crystal molecules to form pre-tilt angles of liquid crystals, so that the liquid crystal molecules in the liquid crystal layer form different pre-tilt angles corresponding to the first common electrode and the second common electrode.

In the photo-alignment process, the light transmittance of the area corresponding to the first common electrode is different from that of the area corresponding to the second common electrode by keeping the pre-tilt angles of the liquid crystal molecules in the liquid crystal layer corresponding to the first common electrode different from those of the liquid crystal molecules in the liquid crystal layer corresponding to the second common electrode, so that a bright area and a dark area with different brightness are formed, thus improving the color shift and improving the quality of the display panel in a wide viewing angle. When voltages of the pixel electrodes are the identical, the pre-tilt angles of the liquid crystal molecules in the liquid crystal layer of the corresponding area can be different, specifically by keeping the common voltage connected to the first common electrode different from the common voltage connected to the second common electrode.

As another embodiment of the present application, a driving method for a display panel is disclosed for driving the display panel, including steps of:

providing a gate drive signal to control gate lines of the display panel to be sequentially connected, and providing a data driving signal to data lines of the display panel; and applying common voltages to a first common electrode and a second common electrode of the display panel, where the common voltages of the first common electrode and the second common electrode are the identical.

In the driving process, the common voltage output to the first common electrode and the second common electrode is the identical common voltage, and the light transmittance of the area corresponding to the first common electrode is different from that of the area corresponding to the second common electrode by keeping the pre-tilt angles of the liquid crystal molecules in the liquid crystal layer corresponding to the pixel electrodes different, so that a bright area and a dark area with different brightness are formed, thus improving the color shift and improving the quality of the display panel in a wide viewing angle. The first common voltage connected to the first common electrode and the second common voltage connected to the second common electrode may also be different. When the pre-tilt angles of the liquid crystal molecules in the liquid crystal layer corresponding to the first common electrode and the second common electrode are determined, the first common voltage connected to the first common electrode and the second common voltage connected to the second common electrode can be fine-tuned according to actual display needs or set in combination with other factors to make the display effect of the display panel better.

It should be noted that, the limitation of the steps involved in this solution, without affecting the implementation of the specific solution, is not determined to limit the sequence of steps, and the previous steps may be executed first, later, or even simultaneously, and shall be deemed to fall within the scope of the present application as long as the solution can be implemented.

The technical solution of the present application can be applied to a wide variety of display panels, such as Twisted Nematic (TN) display panels, In-Plane Switching (IPS) display panels, Vertical Alignment (VA) display panels, Multi-Domain Vertical Alignment (MVA) display panels, and other types of display panels, such as Organic Light-Emitting Diode (OLED) display panels.

The above content is a further detailed description of the present application in conjunction with specific, optional embodiments, and it is not to be construed that specific embodiments of the present application are limited to these descriptions. For those of ordinary skill in the art to which this application belongs, a number of simple derivations or substitutions may be made without departing from the spirit of this application, all of which shall be deemed to fall within the scope of this application.

What is claimed is:
1. A display panel, comprising:
a first substrate;
a second substrate, disposed opposite to the first substrate; and
a liquid crystal layer, disposed between the first substrate and the second substrate;
wherein a display area of the display panel is divided into at least a first area and a second area, and light transmittance of the first area is different from light transmittance of the second area when driven by the identical voltage difference;

pre-tilt angles of liquid crystal molecules corresponding to the first area are different from pre-tilt angles of liquid crystal molecules corresponding to the second area;
wherein the display panel comprises:
a plurality of pixel electrodes, disposed on the first substrate;
a first common electrode; and
a second common electrode;
wherein the first common electrode and the second common electrode are disposed on the second substrate with a spacer disposed between the first common electrode and the second common electrode for insulation from each other;
the first common electrode is overlapped with the corresponding pixel electrodes to form a first area, and the second common electrode is overlapped with the corresponding pixel electrodes to form a second area;
the pre-tilt angles of the liquid crystal molecules in the liquid crystal layer corresponding to the first area are different from the pre-tilt angles of the liquid crystal molecules in the liquid crystal layer corresponding to the second area, and the pre-tilt angles are formed by controlling the first common electrode and the second common electrode to connect with different common voltages in an alignment stage;
wherein the display panel further comprises a common line, and a projection of the common line is disposed corresponding to the spacer between the first common electrode and the second common electrode.

2. The display panel according to claim 1, wherein the light transmittance of the first area is lower than the light transmittance of the second area, and the ratio of the area of the first area to the area of the second area is 1.5 to 2.3.

3. The display panel according to claim 2, wherein the pixel electrodes comprise a first trunk, a second trunk and a plurality of branches, the first trunk and the second trunk intersect perpendicularly to divide the pixel electrodes into a plurality of alignment areas, the branches positioned in a plurality of alignment areas are connected to the first trunk or the second trunk, and the first trunk or the second trunk corresponds to the first area.

4. The display panel according to claim 1, wherein the spacer between the first common electrode and the second common electrode is overlapped with the pixel electrodes.

5. The display panel according to claim 4, wherein the pixel electrodes comprise a first trunk, a second trunk and a plurality of branches, the first trunk and the second trunk intersect perpendicularly to divide the pixel electrodes into a plurality of alignment areas, the branches are connected to the first trunk or the second trunk, and the branches are positioned in the alignment areas;
the first trunk or the second trunk is disposed corresponding to the spacer between the first common electrode and the second common electrode.

6. The display panel according to claim 1, wherein the pre-tilt angles are angles between long axes of the liquid crystal molecules in the liquid crystal layer and the first substrate.

7. The display panel according to claim 1, wherein the liquid crystal layer comprises negative liquid crystal molecules mixed with a reactive monomer.

8. The display panel according to claim 1, wherein the surface of the first substrate is coated with polyimide as an alignment base material.

9. A display panel, comprising:
a first substrate;
a second substrate, disposed opposite to the first substrate; and
a liquid crystal layer, disposed between the first substrate and the second substrate;
wherein a display area of the display panel is divided into at least a first area and a second area, and light transmittance of the first area is different from light transmittance of the second area when driven by the identical voltage difference;
pre-tilt angles of liquid crystal molecules corresponding to the first area are different from pre-tilt angles of liquid crystal molecules corresponding to the second area;
wherein the display panel comprises:
a plurality of pixel electrodes, disposed on the first substrate;
a first common electrode; and
a second common electrode;
wherein the first common electrode and the second common electrode are disposed on the second substrate with a spacer disposed between the first common electrode and the second common electrode for insulation from each other;
the first common electrode is overlapped with the corresponding pixel electrodes to form a first area, and the second common electrode is overlapped with the corresponding pixel electrodes to form a second area;
the pre-tilt angles of the liquid crystal molecules in the liquid crystal layer corresponding to the first area are different from the pre-tilt angles of the liquid crystal molecules in the liquid crystal layer corresponding to the second area, and the pre-tilt angles are formed by controlling the first common electrode and the second common electrode to connect with different common voltages in an alignment stage;
wherein the first common electrode comprises a first vertical portion and a plurality of first horizontal portions, the first vertical portion is in communication with the first horizontal portion, the first horizontal portion extends in a direction perpendicular to the first vertical portion, and the plurality of first horizontal portions are disposed in parallel along a scanning line direction of the display panel with two adjacent first horizontal portions spaced from each other;
the second common electrode comprises a second vertical portion and a plurality of second horizontal portions, the second vertical portion is in communication with the second horizontal portion, the second horizontal portion extends in a direction perpendicular to the second vertical portion, and the second horizontal portions are disposed in parallel with two adjacent second horizontal portions spaced from each other and a spacer disposed between adjacent first horizontal portion and second horizontal portion.

10. The display panel according to claim 9, wherein the first common electrode is connected to a first test pad; the second common electrode is connected to a second test pad; the first test pad and the second test pad are disposed on the identical side as the first vertical portion.

11. The display panel according to claim 9, wherein the width of the first horizontal portions is larger than the width of the second horizontal portions.

12. The display panel according to claim 9, wherein the plurality of pixel electrodes form a display area; the first vertical portion is outside the display area, and the second vertical portion is partially overlapped with the display area.

* * * * *